(12) United States Patent
Olsen

(10) Patent No.: US 8,432,902 B2
(45) Date of Patent: Apr. 30, 2013

(54) RE-ENTRANT CALL ROUTER

(75) Inventor: Ronald D. Olsen, Lake View, NY (US)

(73) Assignee: Dialogic Corporation, Montreal, Quebec (CA)

(*) Notice: Subject to any disclaimer, the term of this patent is extended or adjusted under 35 U.S.C. 154(b) by 501 days.

(21) Appl. No.: 12/824,758

(22) Filed: Jun. 28, 2010

(65) Prior Publication Data

US 2011/0317827 A1 Dec. 29, 2011

(51) Int. Cl.
*H04L 12/28* (2006.01)
*H04M 7/00* (2006.01)

(52) U.S. Cl.
USPC ........... 370/352; 370/356; 370/389; 379/219; 379/220.01

(58) Field of Classification Search .......... 370/352–356, 370/379; 379/219, 220.01
See application file for complete search history.

(56) References Cited

U.S. PATENT DOCUMENTS

| | | | | |
|---|---|---|---|---|
| 2005/0102423 | A1* | 5/2005 | Pelavin et al. | 709/238 |
| 2005/0175166 | A1* | 8/2005 | Welenson et al. | 379/265.02 |
| 2006/0210047 | A1* | 9/2006 | Neyman et al. | 379/219 |

OTHER PUBLICATIONS

Nov. 18, 2009, Portion of Dialogic Web Help related to Generic Number Translation feature pertaining to Dialogic Integrated Media Gateway.

* cited by examiner

*Primary Examiner* — Brandon Renner
(74) *Attorney, Agent, or Firm* — Preti Flaherty Beliveau & Pachios LLP

(57) ABSTRACT

A call routing device in a communication network is re-entrant to permit a set of call routing rules to be applied more than once. A routing table in the routing device has entries to indicate that an incoming call should be rerouted to the routing device to permit additional call routing rule(s) to be applied to the incoming call. A routing table is provided with entries to indicate when an incoming call should be rerouted to the routing device and how call attributes should be created/modified to achieve call routing in one or more iterations of call routing processing using the routing table. The re-entrant routing device and routing table permits a wide variety of call attributes to be used to direct call routing processing using a routing table that can have a reduced number of entries. The re-entrant routing device and routing table permits a flexible configuration for call routing in communication networks while conserving routing device resources.

22 Claims, 3 Drawing Sheets

| Incoming | | | Outgoing | | | |
|---|---|---|---|---|---|---|
| Interface/Device | Calling # | Called # | Interface/Device | Called Name | Host | |
| TDM | 716 XXX-XXXX | * (any) | Reroute | | buffalo.xyz.com | ←402 |
| TDM | 315 XXX-XXXX | * (any) | Reroute | | syracuse.xyz.com | ←404 |
| TDM | 212 XXX-XXXX | * (any) | Reroute | | newyork.xyz.com | ←406 |
| Reroute | * (any) | 1-800-CAMERAS | VoIP | cameras | | ←408 |
| Reroute | * (any) | 1-800-RADIOS1 | VoIP | radios | | ←410 |
| Reroute | * (any) | 1-800-MONITOR | VoIP | monitor | | ←412 |
| ↑422 | ↑424 | ↑426 | ↑428 | ↑430 | ↑432 | |

←400

RE-ENTRANT CALL ROUTER

CROSS REFERENCE TO RELATED APPLICATION(S)

(Not Applicable)

STATEMENT REGARDING FEDERALLY SPONSORED RESEARCH OR DEVELOPMENT (Not Applicable)

BACKGROUND OF THE INVENTION

The present disclosure relates generally to call routing in telephony equipment, and relates more particularly to managing call routing at a call routing device that may include a relatively large number of call routing rules.

Calls that are placed through a communication network typically are connected after a call setup process. Part of the call setup process can include one or more determinations of how the call is to be directed or "routed" through the communication network. A communication network typically is composed of a number of nodes and may include pathways or routes that operate based on different telecommunication principles or protocols. A call that arrives at or leaves a communication network device while traversing a given route may be referred to respectively as an incoming call or an outgoing call. An incoming or an outgoing call is associated with "call information" that may be used to contribute to routing the incoming call as an outgoing call directed to a particular node in the communication network. The term "call information" is used herein to indicate information associated with the call, such as characteristics of the call and/or payload data or signaling information. Call characteristics may include items such as source or destination identifiers or other information that can assist in processing or routing the call. As used herein, the term "call" is meant to refer to any type of telecommunication messaging that can be carried on voice or data or other channels, including for example, payload or content data such as video, audio, image or text data, signaling information or a message waiting indication. Accordingly, the term "call" is used herein to indicate any type of information carried over a telecommunication network, including networks that may each operate based on different communication principles or protocols.

Specialized telephone provider networks have been used in communication networks that implemented time division multiplexing (TDM), analog, or other principles and methods for transmitting voice or data using traditional telephone networks. Implementations of these types of networks include circuit switched networks, such as the publicly switched telephone network (PSTN). More recently, packet switched networks such as internet protocol (IP) networks, such as the Internet, have been used to transport calls and some or all of such call information. For example, technologies such as Voice over Internet Protocol (VoIP) allow users to participate in telephone calls using Internet-based phones that connect through the Internet rather than through traditional telephone networks.

A call routing device, such as a communication gateway, may operate at the interface of two or more networks to route calls and call information and provide any needed conversions, such as converting from one communication protocol used on one network to a different communication protocol used on the other network. Such conversion is well known in the art. When a call is placed, a call connection process occurs to determine how the call should be routed and connected. The call routing device may determine how a call should be routed and connected by examining certain characteristics of the call and call information, such as the source or destination identifiers for the call. The call routing device may be provisioned with various information, including call routing algorithms to determine how the call should be routed and connected, based on such factors as a set of rules applied to the call and/or call information. Such a set of rules provided in the call routing device is often referred to as a dial plan or as a routing table configuration.

A routing table is a construct used by a call routing device such as a gateway to determine how to route incoming calls based on the contents of the routing table and one or more attributes of an incoming call. The call attributes may be determined from the call information, for example. Each of the entries of the routing table, such as a routing table row, is generally provided in the form of a rule. The rule generally is applied to match attributes of the call with a given rule matching criteria, and then to manipulate the call information as specified in the rule. This type of construct for a rule in a routing table can have certain limitations on the flexibility of managing the routing table.

Referring to FIG. 1, a schematic block diagram of a call router 100 is illustrated. Call router 100 is illustrated as a representation of a call routing device in the abstract. For example, call router 100 may be conceptualized as being implemented in hardware or software, and may be viewed as an apparatus or process implementing the disclosed systems and methods.

Call router 100 includes a routing engine 110 that is used to implement call routing in call router 100. Routing engine 110 includes call routing logic 120 and routing table 130, which operate together to perform call routing. Call routing logic 120 provides the logic and processing capability to make call routing determinations based on various criteria. A criteria used by call routing logic to make call routing determinations may be drawn from attributes of an incoming call 102 evaluated against an entry in routing table 130. The configuration of call routing logic 120 and routing table 130 is sometimes referred to as a dial plan. Routing engine 110 receives the input of incoming call information and provides the output of outgoing call information, which can be determined by routing logic 120 and routing table 130.

Routing engine 110 inspects attributes 104 of incoming call 102 and can manipulate attributes 104 in accordance with call routing logic 120. Routing engine 110 can be configured to be responsive to certain call attribute values. For example, routing engine 110 determines and manipulates the attributes of an outgoing call 112 in accordance with attribute values of incoming call 102, call routing logic 120 and an entry in routing table 130, often referred to as a "rule." Routing table 130 in routing engine 110 may include a number of rules as row entries.

Call router 100 can be implemented as a gateway that translates between TDM and VoIP communication networks. With such an implementation, there can be additional challenges for ensuring robust and accurate call routing. In addition, a gateway operating as a call router represents a challenge with respect to administration of gateway configuration. In some instances, a gateway is specifically configured according to a user's needs for translating between a TDM network and a VoIP network. User demands for call routing configurations in a gateway dictate a design that has powerful and flexible administrative and call routing features, which have been a challenge to achieve with the known call routing and routing table configurations.

For example, user applications may implement call routing based on a relatively large number of call attributes. Examples of some of the call attributes that may be used in call routing are listed in Table 1 below.

TABLE 1

Calling Party Number
Called Party Number
Calling Party Name
Called Party Name
Redirecting Party Number
Device (e.g. T1/E1 span, analog port)
Redirecting Party Name
Channel within Device
IP Address
Type of Number (ISDN)
Host Name
Numbering Plan (ISDN)
IP Port
Presentation Indicator (ISDN)

Other types of information may be used to assist in determinations of call routing for a given call. For example, time of day, date or other environmental factors or data, including traffic flow, type of call (e.g. voice or facsimile) and cost considerations may be used to contribute to determining how a call is to be routed through the communication network. As an example of a routing operation, a call placed to an outside line in a telephone switch might implicate the rule "if the number dialed begins with a '9', modify the call attributes to direct the call to an external trunk." Such a rule would have an entry in routing table 130 indicating a call attribute of a first digit being a '9' to match such a dialed number. The rule would include the action of connecting such a matched number with an external trunk, such as by creating/modifying the outgoing call attributes to include an identifier for the external trunk.

In FIG. 1, call router 100 has an incoming call connection 102 with attributes 104. Incoming call attributes 104 have values relating to the parameters of an interface, a call number, a called number, a device number and a channel. In the illustrated attributes 104, the interface parameter has a value of "TDM", the calling number parameter has a value of 716-739-9003, the called number parameter has a value of 1-800-CAMERAS, the device number parameter has a value of 1 and the channel parameter has a value of 15. Attributes 104 are examined by call routing logic 120 in routing engine 110 to produce an outgoing call 112. While incoming call 102 has attributes 104 related to a TDM interface, outgoing call 112 has attributes 114 that relate to a VoIP interface. Accordingly, attributes 114 include parameters for an interface, a calling number, a called numbered, a called name and a host. Incoming call 102, as well as outgoing call 112, may have one or a number of associated parameters that may be selected by call routing logic 120 in routing engine 110 for determining call routing. Accordingly, attributes 104 are illustrative for a TDM interface, and attributes 114 are illustrative for a VoIP interface.

The parameter values of attributes 114 can be determined by routing engine 110 based on a set of rules in routing table 130, in conjunction with the parameter values of attributes 104. As shown by attributes 114, the listed parameters and parameter values may be particular to the interface through which a call is processed by call router 100. In the general case, incoming call 102 and outgoing call 112 may have one or more associated parameters, respectively, that are used for call routing in relation to interfaces (not show) available to call router 100.

A rule for routing incoming call 102 that is implemented in call router 100 may have a matched criteria for call attributes 104 of: interface=TDM; called number=1-800-CAMERAS. When incoming call 102 matches this example rule criteria, as indicated by parameter values in attributes 104 being matched to an entry in routing table 130, the rule is applied to produce attributes 114 of outgoing call 112. The resulting operation by call router 100 to create/modify attributes 114 for outgoing call 112 may include: an action to set the interface parameter value to VoIP; maintain the calling number parameter value; change the called number to 101; and set the host address to "buffalo.xyz.com." The particular rule in this case is found (matched) in routing table 130.

Referring now to FIG. 2, the above described operations for routing a call depend on resources (not shown) within call router 100 to store rules in a routing table 200 that can be searched, matched and applied to incoming call 102 to provide a mechanism for customizing call routing for outgoing call 112. Thus, routing table 200 can represent an implementation of routing table 130 in routing engine 110 of FIG. 1. The entries in routing table 200 are typically configured and entered by an administrator to obtain a desired set of rules for call routing. Due to the nature of how routing table 200 is configured and used in call routing, an administrator may spend a significant amount of time entering routing table rules for each desired routing operation based on incoming and outgoing call attributes 104, 114. In addition, the administrator may prefer to test the routing table entries before committing the rules to active operation in call router 100. The time expended in entering, testing and maintaining routing table entries may increase dramatically when a large number of call attributes 104, 114 are used to make determinations for call routing. Such a large number of call attributes 104, 114 that are tested by a given set of rules in routing table 200 may result in a large number of rules, in some cases larger than that which can be easily supported or maintained using the resources available in the system in which call router 100 is implemented.

FIG. 2 shows how a relatively large number of routing table entries in comparison to available resources (including administrative entering, testing and maintenance) can result from even a relatively small number of incoming call attributes 104 being examined for rule matching and call routing. Routing table 200 is illustrated with a number of rows representing call routing rules 220-226. Each of rules 220-226 is illustrated as including incoming call attributes 210 that are matched against incoming call attributes 104 to determine which rule(s) to apply for call routing of incoming call 102. Each of rules 220-226 that occupies a row in routing table 200 includes a set of outgoing call attributes 230 to be applied to provide call routing. Outgoing call attributes 230 are selected based on which rule out of rules 220-226 is matched to incoming call 102.

Rules 220-226 can represent a portion of rules for call routing used by a company XYZ. Company XYZ may, for example, wish to take incoming calls from a traditional telephone network, and route the calls to operators on various VoIP networks. The XYZ company may have set up several servers in different cities to provide a facility for operators to answer calls routed to each server. In routing table 200, an attribute column 206 provides a host parameter for URL entries for the different host cities, namely, Buffalo, Syracuse and New York. An attribute column 205 provides an identifier parameter for a particular product of XYZ company to further direct incoming calls. Call routing may be provided by producing, for example, a final URL used to route an incoming call. The called identifier can have a product name as the called name used in conjunction with the host URL, such as CAMERAS @buffalo.xyz.com, as can be indicated by rule 220 of routing table 200.

Routing table 200 is used to indicate an incoming area code parameter, such as 716, 315 or 212 as shown in an attribute column 202, that can be used to match an area code of an incoming call to determine a corresponding host parameter address for the call from attribute column 206. The called number parameter entry in attribute column 203 may also be used to determine a corresponding called name parameter value from attribute column 205.

As shown, routing table 200 is configured to support three area codes (716, 315 and 212), three products (cameras, radios and monitors) and three cities (Buffalo, Syracuse and New York) for call routing purposes. The methodology involved in using routing table 200 to contribute to routing a call would result in nine rules (3×3) that would be entered, and preferably tested, to permit the router to support the entire set of permutations for area codes of incoming calls, cities in which servers are located and the different products of company XYZ.

A drawback to an approach of using the methodology of call routing rules in accordance with routing table 200 is seen when additional area codes, products or cities are to be added to routing table 200. For example, if a new product is added, a new rule for the product is added to routing table 200 for each area code or for each city. In the example given above, if there were ten products and ten area codes or cities, the addition of a product represents an additional ten call routing rule entries in call routing table 200, one for each of the ten such area codes or cities. Such a modification to routing table 200 can be cumbersome and difficult to administer, and it can reduce or eliminate the available resources for further entries in routing table 200.

In practice, the call routing table has a limited capacity for the number of rules that can be defined. Therefore, as more rules or parameter additions are desired, the call router may not have the resources to implement additional rules that are desired to cover parameter permutations. In addition, management of the entries in the routing table can represent a significant burden on an administrator in terms of an amount of time used to enter and test the various permutations of rules or parameters.

SUMMARY

In accordance with the present disclosure, there is provided systems and methods for implementing a re-entrant call router to provide call routing services. The re-entrant aspect of the call router permits more than one rule to be applied to route a given call.

According to an aspect, the disclosed systems and methods provide a call router with a routing table with an entry to indicate call routing to the call router. The entry in the routing table directs an incoming call to the call router to permit the incoming call to be processed through the call router more than once. The incoming call that is so rerouted to the call router can have additional rules applied to the rerouted incoming call in further call routing iterations. In this way, an incoming call can effectively be processed through the call router with multiple passes to permit call information to be manipulated according to a variety of techniques. The routing table can include rule entries that operate in conjunction with the multiple pass configuration. In addition, the routing table can accommodate conventional rule entries, such that the call routing control paradigm is not fundamentally altered.

According to an aspect of the disclosed systems and methods, a particular field in an entry of a routing table is set to indicate that the call should be rerouted to the call router hosting the routing table. For example, an entry in a routing table may include a destination or routing identifier to which the call can be routed in accordance with a given rule for call routing. The destination or routing identifier in the field of the call routing table entry can be set to a value that indicates that the call should be rerouted to the call router, to permit re-entrant modification of the call information.

BRIEF DESCRIPTION OF THE SEVERAL VIEWS OF THE DRAWINGS

The present disclosure is described in greater detail below, with reference to the accompanying drawings, in which.

DETAILED DESCRIPTION OF THE INVENTION

Figure 3:
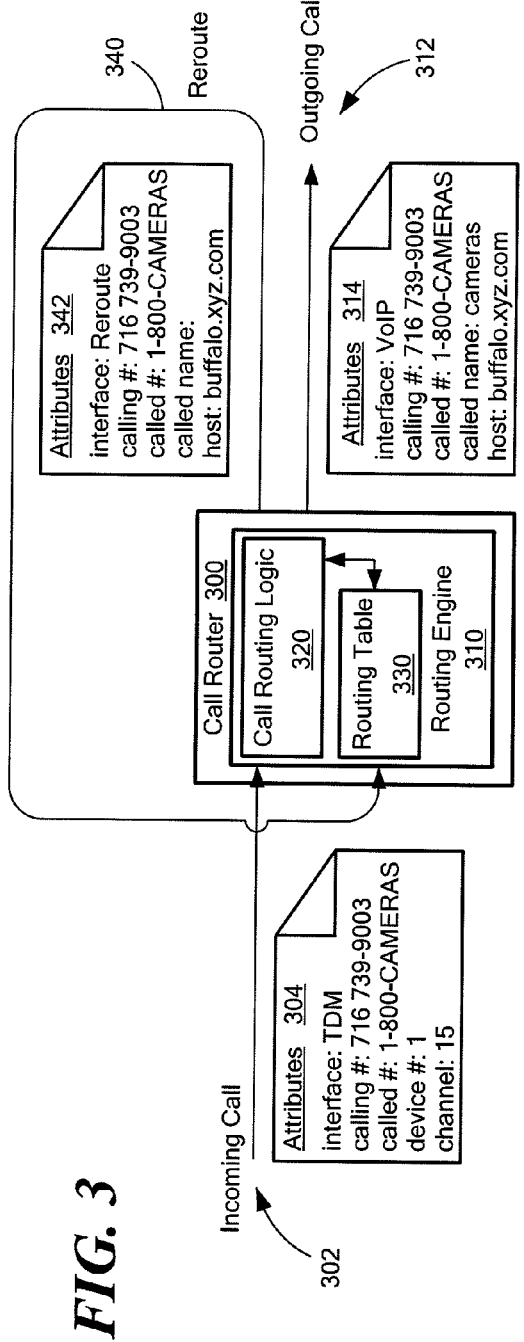
FIG. 3 is a schematic block diagram of a call router and call router function illustrating re-entrant operation.

Referring now to FIG. 3, a re-entrant call router 300 is illustrated in accordance with an exemplary embodiment of the systems and methods of the present disclosure. Call router 300 has a routing engine 310 that includes call routing logic 320 and a routing table 330. Routing engine 310 has a configuration to permit an incoming call 302 to be rerouted to call router 300, and thus routing engine 310, so that a rule matching process in routing table 330 of routing engine 310 can be applied more than once. When routing engine 310 is configured to permit re-entrant operation so that calls can be rerouted to call router 300, the number of rule entries in routing table 330 can be significantly reduced while continuing to represent a desired number of permutations in call routing manipulations.

In the example shown in FIG. 3, call attributes 304 are associated with incoming call 302. Routing engine 310 is configured with routing logic 320 and routing table 330 to inspect incoming call attributes 304, to locate a matching entry in routing table 330 that corresponds to call attributes 304, and to provide outgoing call attributes 314.

An entry in routing table 330 that corresponds to (matches) call attributes 304 may include an indication that incoming call 302 is to be rerouted to call router 300 to be processed through an additional iteration of call routing processing in routing engine 310. A rerouting path 340 illustrates the case where an incoming call 302 is rerouted to call router 300 and routing engine 310 based on entries in routing table 330 provided in routing engine 310. Rerouted call attributes 342 are illustrated for rerouted call 340 to illustrate how re-entrant routing can be implemented in accordance with the disclosed systems and methods. Call attributes 342 can include an interface parameter value indicated as "reroute" and a host parameter value of "buffalo.xyz.com." The called name parameter value of call attributes 342 is empty or blank, whereas calling number and called number parameter values for call attributes 342 remain the same as for call attributes 304 of incoming call 302. Accordingly, call attributes 342 with an interface parameter value of "reroute" represents a call that is rerouted to routing engine 310 for further call routing processing.

In the first pass through routing engine 310, call attributes 342 of rerouted call 340 may be partially created or modified, meaning that all intended attribute value creations/modifications need not be completed on the first pass. For example, call attributes 342 have a host parameter value set to "buffalo.xyz.com" on a first pass through routing engine 310, while the called name parameter value is left blank, or unchanged. An interface parameter of call attributes 342 is set to "reroute" to indicate that rerouted call 340 is to be directed to a destination or node identified as routing engine 310. By setting call attributes 342 to have an interface parameter value of "reroute," rerouted call 340 is presented to routing engine 310 for a second pass of routing processing. This limited creation/modification of attribute values for call attributes 342 provides flexibility for call routing determinations since a single attribute value can be created/modified in a pass through routing engine 310, with the potential for further attribute value creation/modification with further passes. This flexibility permits the disclosed systems and methods to avoid the more rigid application of a single rule for a given permutation of call information to achieve a desired call routing determination.

Upon a second pass through routing engine 310 via rerouted call 340, outgoing call 312 is produced with call attributes 314. Call attributes 314 include an interface parameter value set to "VoIP" and a called name parameter value set to "CAMERAS" to finalize the call routing attributes for outgoing call 312. In the second pass through routing engine 310, a limited number of attribute parameter values are created/modified in accordance with a matching routing table entry of routing table 330. Rerouted call 340, upon being presented to routing engine 310, is matched against entries of routing table 330 that include an interface parameter value of "reroute." Other attribute parameter values, such as the called number parameter value, are matched against respective entries in rows of routing table 330 that include the interface parameter value of "reroute." The result of processing a rerouted call such as rerouted call 340 results in specified call attributes being created/modified for outgoing call 312. Accordingly, call attributes 314 are the same as call attributes 114 shown in FIG. 1 for this call routing example. However, call attributes 314 for outgoing call 312 were achieved with the re-entrant call router 300, using a reduced size call routing table 330 with the added flexibility of rerouted call 340.

Figure 4:
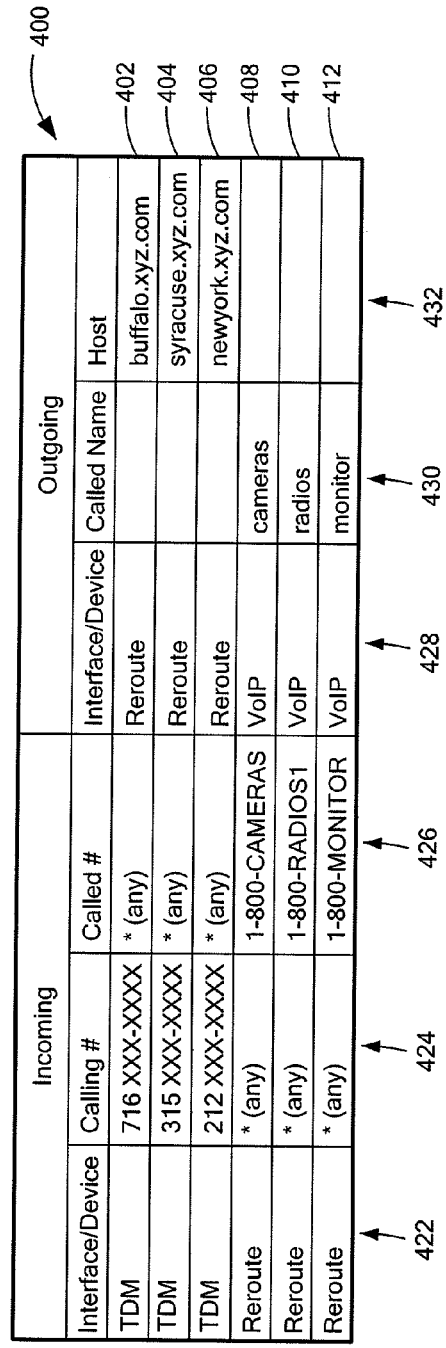
FIG. 4 is a diagram of a call routing table with entries indicating re-entrant operation.

Referring to FIG. 4, an illustration of a call routing table 400 in accordance with the disclosed systems and methods is illustrated. In the example of routing table 400, call routing rules are provided in rows 402-412 that can be searched and applied against an incoming call to determine a desired call routing processing result. For example, rows 402, 404 and 406 of routing table 400 illustrate entries that have a call routing processing result of rerouting the incoming call to the call router, such as call router 300 in FIG. 3. It is noted that in accordance with FIGS. 3 and 4, the terms "device" and "interface" are used interchangeably to indicate a call routing source or target.

An incoming call attribute column 426 of routing table 400 indicates a called number parameter value and has a wildcard symbol "*" in each of the incoming call entries of associated rows 402, 404 and 406. An outgoing call attribute column 428, which indicates device parameter values, includes entries with parameter values of "reroute" to indicate that the call is to be directed to call router 300. An attribute column 430, which indicates called name parameter values, has values that are blank or empty, indicating that those values are not created/modified in the iteration represented by the rule entries in rows 402, 404 and 406.

In the example provided by routing table 400, an incoming call that has an interface/device parameter value of "TDM" and a calling number parameter value with an area code of 716, 315 or 212 is matched to the respective rule in rows 402, 404 or 406, as indicated by the values in attribute columns 422 and 424. Upon being matched, the outgoing call attributes, such as call attributes 342 in FIG. 3, are modified or created to have the value "reroute" for the outgoing call interface/device value, as indicated by the entries in attribute column 428 for rows 402, 404 and 406. The "reroute" value for the interface/device parameter value directs the call to an input of call router 300 (FIG. 3), such as an input to routing engine 310.

The incoming call matched to one of the rules specified in rows 402, 404 or 406 has the outgoing call attributes specified in attribute column 432 for the host parameter value corresponding to the incoming call attribute column 424 calling number parameter value. For example, in accordance with row 402, an incoming call on the TDM interface with a 716 area code has the outgoing interface set to "reroute" and the host parameter value set to "buffalo.xyz.com," while the called name parameter value is left unchanged as indicated by the blank or empty entry in attribute column 430. With the interface parameter value set to "reroute," the outgoing call is directed to call router 300 and routing engine 310 for further call routing processing.

Call router 300 in FIG. 3 can be configured to define various interfaces or devices for call routing sources or targets in accordance with the present disclosure. For example, while call router 300 can be configured to define hardware-related interfaces indicated as TDM or VoIP in respective attribute columns 422 and 428, other internal or virtual interfaces, such as an interface labeled "reroute," can also be defined. The interface/device parameter value of "reroute" shown in attribute columns 422 and 428 of routing table 400 can be defined within call router 300 for use in call routing as a virtual or internal interface for use in conjunction with call routing table 400. Accordingly, while the routing processing in routing engine 310 provides outgoing call attributes to interfaces/devices "TDM" and "VoIP" that ultimately identify hardware interfaces for call routing, the "reroute" device or interface can be defined virtually to permit calls to be rerouted internally in call router 300. Thus, the interface parameter found in call attributes 304, 314 and 342 can be used to identify a call routing destination for the call currently being processed, which destination can be an input to routing engine 310.

One way in which rerouting may be implemented in call router 300 in accordance with an exemplary embodiment of the disclosed systems and methods is to provide call attributes as data structures that are passed between different hardware and/or software modules within call router 300 to effect call routing. For example, call attributes 304 may be implemented as part of a larger data structure that can contain specified storage locations for holding different identified parameter values related to call information. In the case of call attributes 304, 314 and 340, the data structure would include parameter values in specified storage locations for interface, calling number, called number, device, channel, called name and host parameters. The data structure may also provide specified storage locations for any other parameters that might be used by any of the interfaces or devices in call router 300. Such a data structure would be constructed to be able to accommodate all the different parameters that might be used by any of the devices or interfaces that are available to call router 300. When one or more parameter values in the data structure are modified by routing engine 310, the modifications to the various storage locations in the data structure are usable to indicate the desired call routing. Therefore, when routing engine 310 modifies the interface parameter in the data structure to have a value of "reroute," for example, that value may be used to determine how the data structure is to be handled to contribute to call routing processing. For example, the value of "reroute" can be used by routing engine 310 to pass the data structure to a hardware and/or software module that represents the input of routing engine 310. Thus, rerouted call 340 is presented to routing engine 310 with a data structure that is at least partially filled out with call attributes 342. Routing engine 310 then treats rerouted call 340 as a incoming call and conducts call routing processing on the contents of the data structure that includes call attributes 342, in accordance with the rules provided by routing table 330 and call routing logic 320.

A rerouted call presented to the call router, such as call router 300 in FIG. 3, may include an interface parameter value of "reroute" to match the value provided in the incoming call attribute column 422 to identify a rerouted call. The rerouted call is processed in accordance with one of the rules provided in rows 408, 410 or 412 of routing table 400 that matches specific attribute values of the call. The incoming call with an interface parameter value of "reroute" that is matched to the called number parameter values in attribute column 426 is processed to have outgoing call attributes as specified in call attribute columns 428 and 430 in rows 408, 410 or 412 of call routing table 400. The host parameter value of the rerouted calls was created/modified in the previous iteration, and those entries for attribute column 432 in rows 408, 410 and 412 are blank or empty to indicate that no further creation/modification occurs for the host call attributes in attribute column 432.

Figure 1:
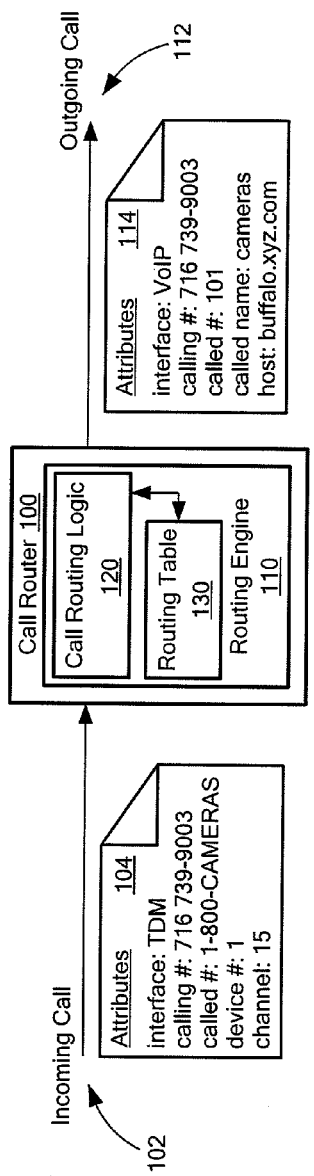
FIG. 1 is a schematic block diagram of a conventional call router and call router function.
Figure 2:
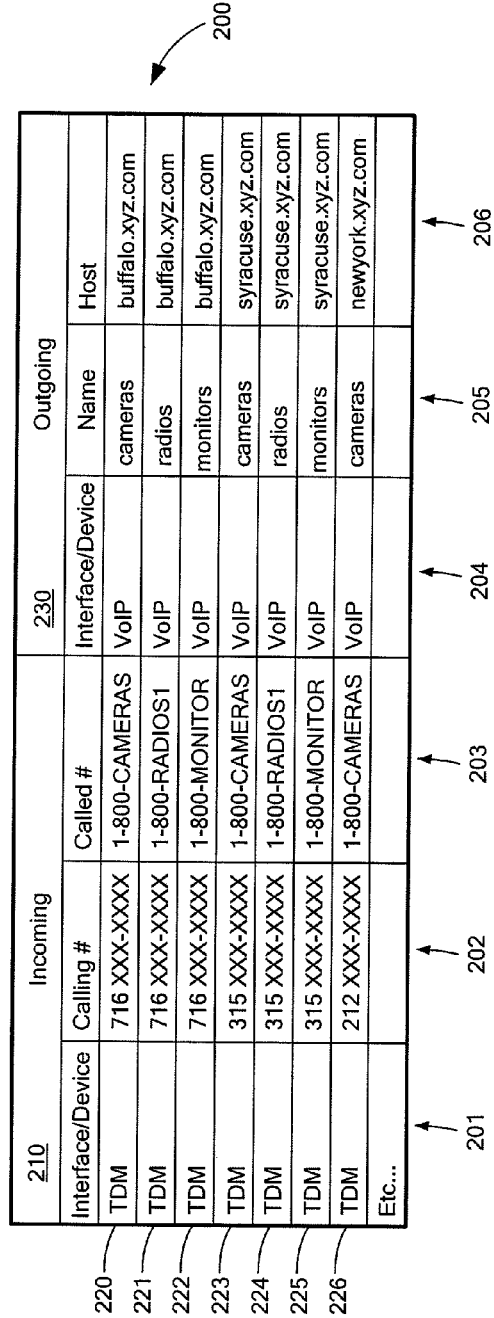
FIG. 2 is a diagram of a call routing table with conventional entries.

In this example, the final result of the calls rerouted through call router 300 is the same as would be achieved with call router 100 and routing table 200 illustrated in FIGS. 1 and 2. However, call routing table 200 has nine entries (3×3), while call routing table 400 has six entries. As the number of call attributes that are specified for call routing processing increases, the re-entrant capability of call router 300 permits call routing table 400 to be administered and maintained with greater ease and simplicity over the configuration of call router 100 and routing table 200 shown in FIGS. 1 and 2. In addition, the size of call routing table 400 can be greatly reduced in comparison with routing table 200, since re-entrant operation for call router 300 permits the number of rule entries in routing table 400 to be significantly reduced, in some cases by an order of magnitude, over the equivalent number of rule entries in routing table 200.

The greater ease of administration and maintenance of call router 300, as well as the reduced size of routing table 400, is readily seen in the event of an update to call router 300 and/or routing table 400. For example, if an administrator seeks to add entries to routing table 400 to accommodate call routing for a new product, say televisions, a single entry as a new row of routing table 400 can be added with an incoming call device parameter value of "reroute" provided in attribute column 422. Entries in attribute columns 426 and 430 in the new row are set to accommodate the new product call routing, and the configuration of routing table 400 for the new product is complete. The same type of modification to routing table 200 in FIG. 2 would mean the addition of three new row entries for rules to accommodate a called number and called name entry for each host location. Deleting entries related to a product that might not be offered any longer has similar advantages for administration in accordance with the present disclosure, in that the changes to routing table 400 are greatly simplified over the equivalent changes that would be made to routing table 200.

An advantageous aspect of the disclosed systems and methods is that each entry in a routing table that permits re-entrant operation, such as is illustrated in routing table 400, can have multiple call attributes specified for call routing. For example, in accordance with the example of routing table 400, the host parameter values shown in attribute column 432 depend on the call number values shown in attribute column 424 for rows 402, 404, and 406. In addition, each of those rows indicate that the called number parameter values in call attribute column 426 can take on any value, since the outgoing call attribute settings for the name parameter values in attribute column 430 are not set on the initial iteration through routing engine 310. This facility in routing table 400 can be used to isolate one or more call attribute parameter values for manipulation, while isolating one or more other call attribute parameter values to be unchanged. Each iteration through routing engine 310 can thus operate on a single call attribute parameter value, while avoiding an expansive listing of rules for multiple variable values. This flexibility permitted by configuring call router 300 to be re-entrant, in conjunction with the configuration of routing table 400, represents a significant benefit of the present disclosure.

Moreover, the number of re-entrant iterations for call routing that can be implemented using call router 300 and routing table 400 is not limited, thereby permitting significant flexibility in call routing rules and call routing implementation. In addition, a greater number of call attributes than that which was practically available in prior call routing processes may be used or made available for call routing in accordance with the disclosed systems and methods, thereby greatly increasing the usefulness and flexibility of call router 300. At the same time, the available resources of call router 300, such as memory, can be conserved while increasing functionality.

While the number of iterations that a call may be rerouted to call router 300 and passed through routing engine 310 is not limited in accordance with the disclosed systems and methods, in practice as many as 2-5 iterations generally should be sufficient for the majority of applications. In addition, it may be desirable to avoid an endless loop in which a call may continually be rerouted through a same set of rules in call router 300. To avoid such an endless loop of operation in practice, a mechanism (not shown), which may include a counter, for example, can be provided in routing engine 310 to indicate the number of iterations or re-routings through the call router that a given call is subjected to. For example, the mechanism can have an input of the incoming interface or device parameter value, such as might be provided in call attributes 304, and may update a counter whenever the interface or device parameter has a value of "reroute." If the indicated count exceeds a given value, the call can be terminated or dropped, or, if the call attributes result in a valid call, the call can be routed with the call attributes as they stand. In addition, or alternately, the dropping of the call due to excessive rerouting operations can be noted or logged to permit an administrator to review the situation in the event that the re-entrant routing table contains an entry with an error, for example.

Figure 5:
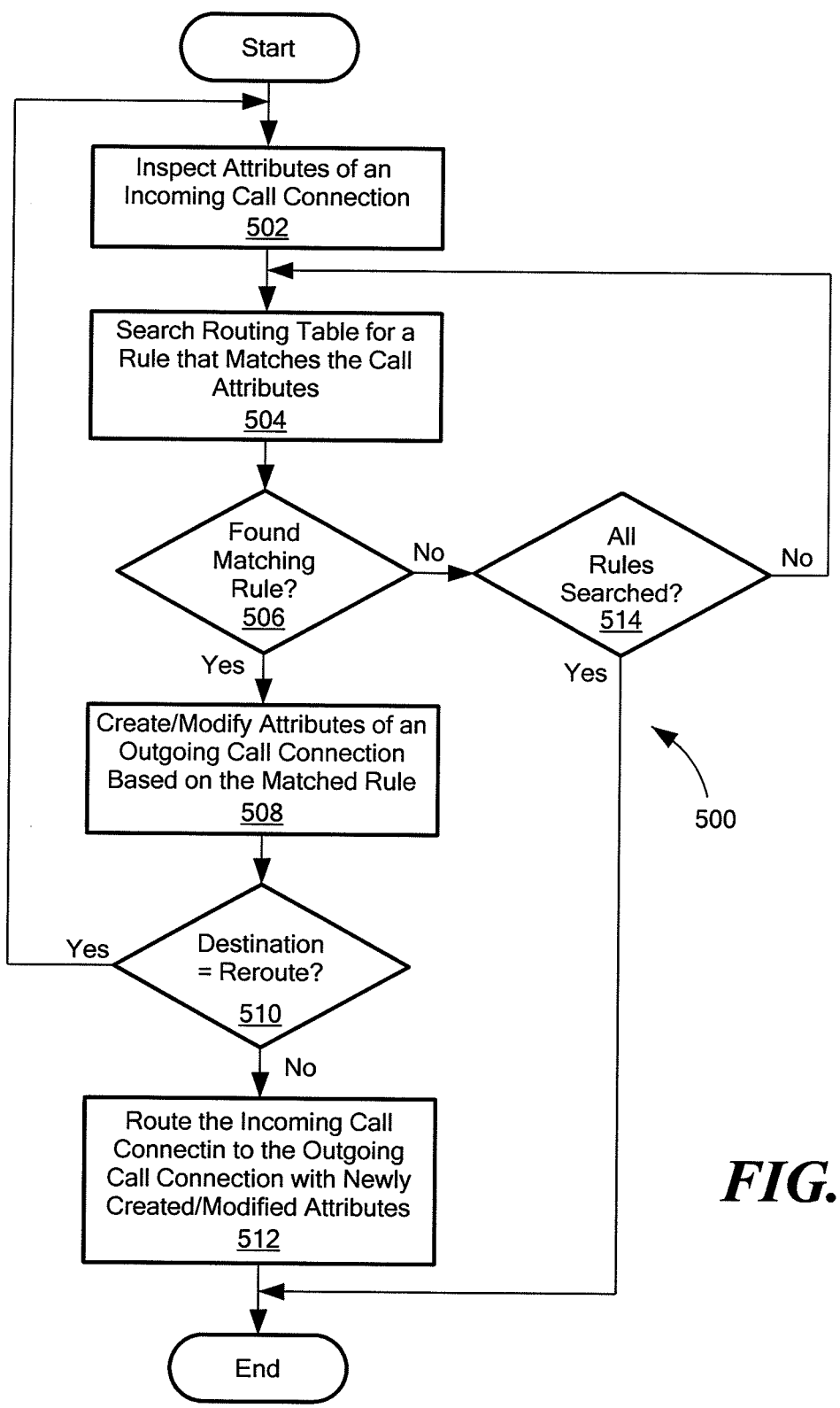
FIG. 5 is a flowchart illustrating an exemplary embodiment of a re-entrant call routing process.

Referring now to FIG. 5, a process flow for a call router, such as call router 300, is illustrated with flowchart 500. Flowchart 500 begins with a block 502 that indicates the inspection of attributes of an incoming call connection. The incoming call connection attributes are used to conduct a search, as indicated in a block 504. Block 504 indicates a search of a routing table, such as routing table 330 or 400, to locate a rule that matches attributes of the incoming call. A decision block 506 indicates a determination of whether a matching rule is found in accordance with the search indicated in block 504. If a matching rule is found in the routing table, decision block 506 indicates a transfer to a block 508 along a "Yes" path. Block 508 indicates the action of creating/modifying attributes of an outgoing call connection, based on the contents of the matching rule resulting from the search conducted as indicated in block 504.

In accordance with an exemplary embodiment of the disclosed systems and methods, following the action indicated in block 508, processing continues as indicated by decision block 510 with a determination of whether the destination of the output call attributes indicates that the call should be rerouted to an input of routing engine 310 (FIG. 3), based on a destination attribute value, such as "reroute," for example. Decision block 510 illustrates a determination of whether an attribute parameter value indicates a re-entrant or reroute destination. If it is determined, as indicated in decision block 510, that the call should be rerouted to call router 300, and thus the input of routing engine 310, the "Yes" path out of decision block 510 is indicated, to return processing to a point where the rerouted call attributes are presented for inspection to routing engine 310, such as may be achieved as indicated in block 502. If it is determined that the destination of the call following call routing processing is not the input of routing engine 310, the processing continues to call routing operations in a block 512, as indicated by the "No" path of decision block 510. Block 512 indicates processing to route the call connection to the outgoing call connection destination with the newly created/modified attributes that were determined as indicated in block 508.

If the determination indicated in decision block 506 results in no matches being found, the result is indicated by the No branch being taken to a decision block 514. Decision block 514 indicates a determination of whether all rules have been searched, and, if so, indicates processing taken along the "Yes" branch to the end of the process depicted in flowchart 500. If all rules have not been searched, decision block 514 indicates processing along the No branch to block 504, which indicates continued operations to search the routing table for a rule that matches the call attributes. Processing continues as indicated in block 504 until a match is found or all the rules have been searched. The end result of the process illustrated in flowchart 500 is that incoming calls can be processed multiple times through routing engine 310 with rules matched from a routing table such as routing table 330 or 400 (FIG. 4) until the call is routed to another node with all the desired additions/modifications to the call attributes.

While flowchart 500 illustrates an exemplary embodiment of the disclosed systems and methods, it should be readily appreciated by those of ordinary skill in the art that other variations and possible implementations in keeping with the re-entrant operation of call router 300 can be achieved. For example, flowchart 500 includes a determination of whether the destination of the call being processed for call routing is the input of routing engine 310, as indicated in decision block 510. However, such a determination is not required to realize the presently disclosed systems and methods. Alternate or additional processing than that indicated by decision block 510 may be implemented based on the determination that the outgoing call attributes identify call router 300 and/or the input of routing engine 310 as the destination. For example, an outgoing interface or device can be defined that emulates, or is the same as, an input to routing engine 310. Thus, while interfaces and/or devices have typically been defined in a routing device, such as the conventional call router 100 shown in FIG. 1, to indicate hardware interfaces for communication networks, the presently disclosed systems and methods permit interfaces and/or devices to be defined for specialized processing of call information and/or call attributes of a call undergoing call routing processing. As an example, and as indicated in routing table 400 in FIG. 4, an interface or device can be defined for re-entrant call routing processing, which is indicated in routing table 400 in columns 422 and 428 with the parameter value of "reroute." By defining the specialized "reroute" parameter value for an interface/device, routing engine 310 (FIG. 3) can use available mechanisms for directing modified and/or created call attributes to a desired designation and/or interface or device. By making use of available mechanisms for call routing, the disclosed systems and methods can be implemented within an existent framework to avoid increasing the complexity of the implementation, while providing additional flexibility for call routing processing.

The disclosed systems and methods are directed to call routing in a communication network and can be implemented with communication equipment of various types and various numbers. For example, the disclosed systems and methods may be implemented using a telephone switch in a TDM network, a router in a packet-switched network, a gateway connected between a circuit-switched network and a packet-switched network, a mobile switching center (MSC) for switching wireless communications with a landline network, and any other type of telephony equipment that includes or implements call routing logic.

The presently disclosed systems and methods may be implemented in a call routing device using hardware and/or software configurations. For example, a call router such as a gateway may implement the disclosed systems and methods using a processor that executes instructions from a memory. Such implementations may use various abstract concepts to organize the operations of the call routing device, such as storage memory constructs including queues or routing tables. The operations of the call routing device may be organized to form a call routing engine that receives incoming calls and/or associated incoming call information, and provides outgoing call information for routing outgoing calls in accordance with routing rules and the incoming call information. Such a call routing engine may be implemented as one or more hardware and/or software modules, and the incoming and/or outgoing call information may be presented in the form of data structures for manipulation or output by the modules.

The operations herein described are purely exemplary and imply no particular order. Further, the operations can be used in any sequence when appropriate and can be partially used. With the above embodiments in mind, it should be understood that the disclosed systems, devices, methods and/or uses can employ various computer-implemented operations involving data transferred or stored in computer systems. These operations are those requiring physical manipulation of physical quantities. Usually, though not necessarily, these quantities take the form of electrical, magnetic, or optical signals capable of being stored, transferred, combined, compared, and otherwise manipulated.

Any of the operations described herein that form part of the present disclosure are useful machine operations. The present disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines employing one or more processors coupled to one or more computer readable medium, described below, can be used with computer programs written in accordance with the teachings herein, or it may be more convenient to construct a more specialized apparatus to perform the required operations.

The disclosed system and method can also be embodied as computer readable code on a computer readable medium. The computer readable medium is any data storage device that can store data, which can thereafter be read by a computer system. Examples of the computer readable medium include hard drives, read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

The foregoing description has been directed to particular embodiments of the present disclosure. It will be apparent, however, that other variations and modifications may be made to the described embodiments, with the attainment of some or all of their advantages. The procedures, processes and/or modules described herein may be implemented in hardware, software, embodied as a computer-readable medium having program instructions, firmware, or a combination thereof. For example, the functions described herein may be performed by a processor executing program instructions out of a memory or other storage device. Therefore, it is the object of the appended claims to cover all such variations and modifications as come within the true spirit and scope of the present disclosure.

What is claimed is:

1. A re-entrant routing device in a communication network for routing calls, comprising:
    a processor communicatively coupled to a storage memory to access and execute instructions stored in the storage memory, the processor being operative to execute instructions to provide call routing;
    a plurality of call routing rules being stored in the storage memory and being accessible to the processor;
    the processor being operative to provide call routing by matching a call routing rule from the plurality of call routing rules with incoming call information that is associated with an incoming call and providing outgoing call information associated with the incoming call and indicating a routing destination in accordance with the call routing rule; and
    the processor being responsive to the call routing rule to provide the outgoing call information with an indication that the routing destination is the routing device, whereby the routing device is re-entrant for call routing.

2. The routing device according to claim 1, further comprising a routing identifier in the call routing rule to identify the routing device as the routing destination.

3. The routing device according to claim 2, wherein the processor is operative to execute instructions to be responsive to the call routing rule to provide the routing identifier in the outgoing call information.

4. The routing device according to claim 2, wherein the processor is operative to execute instructions to define an input interface for processing the incoming call; and
    the routing identifier identifies the input interface.

5. The routing device according to claim 1, further comprising:
    another call routing rule from the plurality of call routing rules, wherein the another call routing rule includes a source identifier that identifies the routing device as a source of the incoming call information.

6. The routing device according to claim 1, wherein the call routing rule includes an entry to indicate that a portion of the outgoing call information is free of modification.

7. The routing device according to claim 1, wherein the processor is operative to search the plurality of call routing rules to identify the call routing rule based on the incoming call information.

8. The routing device according to claim 1, wherein the processor is responsive to two or more sequentially applied call routing rules to provide the outgoing call information with an indication that the routing destination is the routing device.

9. The routing device according to claim 1, wherein the routing device is one or more of a telephone switch, packet router, a gateway or a mobile switching center.

10. A method for routing calls with a call routing device in a communication network, comprising:
    receiving incoming call information associated with an incoming call and being receivable through an interface of the call routing device;
    identifying a call routing rule in a plurality of call routing rules that includes a routing criteria that matches at least a portion of the incoming call information; and
    applying the call routing rule to provide outgoing call information that includes an indication of a routing destination, wherein the indication identifies the interface of the call routing device.

11. The method according to claim 10, further comprising:
    providing a routing destination identifier in the call routing rule that identifies the interface of the call routing device.

12. The method according to claim 11, further comprising:
    providing the routing destination identifier in the outgoing call information.

13. The method according to claim 10, further comprising:
    defining a routing destination that corresponds to the interface of the call routing device; and
    identifying the routing destination with the indication.

14. The method according to claim 10, further comprising:
    receiving a source identifier in the incoming call information, wherein the source identifier identifies call routing device as a source of the incoming call information.

15. The method according to claim 10, further comprising:
    including an entry in the call routing rule to indicate that a portion of the outgoing call information is free of modification.

16. The method according to claim 10, further comprising:
    searching the plurality of call routing rules to identify the call routing rule based on the incoming call information.

17. The method according to claim 10, further comprising:
    sequentially applying another two or more call routing rules from the plurality of call routing rules to provide the outgoing call information with the indication that identifies the interface of the call routing device.

18. A gateway for routing calls in a communication network, the gateway configured to implement the method according to claim 10.

19. A method for routing calls with a call routing device in a communication network, comprising:
    receiving an incoming call at an input of the call routing device; and
    rerouting the incoming call to the input of the call routing device in response to a content of a selected call routing rule and incoming call information associated with the incoming call.

20. The method according to claim 19, further comprising:
    providing outgoing call information for the rerouted incoming call in response to a content of another selected call routing rule and incoming call information associated with the rerouted incoming call; and routing the rerouted incoming call in accordance with the outgoing call information.

21. The method according to claim 19, further comprising:

rerouting the incoming call to the input of the call routing device two or more times in response to a content of at least another selected call routing rule.

22. A re-entrant routing device in a communication network for routing calls, comprising:

a processor communicatively coupled to a storage memory to access and execute instructions stored in the storage memory, the processor being operative to execute instructions to provide call routing;

a plurality of call routing rules being stored in the storage memory and being accessible to the processor;

the processor being operative to provide call routing by matching a call routing rule from the plurality of call routing rules with incoming call information that is associated with an incoming call and providing outgoing call information associated with the incoming call and indicating a routing destination in accordance with the call routing rule; and the call routing rule includes an indication that the routing destination is the routing device, whereby the routing device is re-entrant for call routing.

* * * * *